(12) United States Patent
Gault et al.

(10) Patent No.: US 8,521,548 B2
(45) Date of Patent: Aug. 27, 2013

(54) RATE CENTER TRANSLATION

(75) Inventors: Thomas A. Gault, Troy, MI (US);
Matthew R. Mannikka, St. Clair Shores, MI (US); Dennis M. Bodrie, Plymouth, MI (US); Laura R. Chmielewski, Huntington Woods, MI (US); Richard J. Moll, Clarkston, MI (US)

(73) Assignee: General Motors LLC, Detroit, MI (US)

( * ) Notice: Subject to any disclaimer, the term of this patent is extended or adjusted under 35 U.S.C. 154(b) by 546 days.

(21) Appl. No.: 12/704,198

(22) Filed: Feb. 11, 2010

(65) Prior Publication Data
US 2011/0196805 A1 Aug. 11, 2011

(51) Int. Cl.
*G06Q 10/08* (2012.01)

(52) U.S. Cl.
USPC .......................................................... 705/1.1

(58) Field of Classification Search
None
See application file for complete search history.

(56) References Cited

U.S. PATENT DOCUMENTS

| | | | | |
|---|---|---|---|---|
| 7,289,621 | B2 * | 10/2007 | Addicks | 379/220.01 |
| 2008/0043948 | A1 * | 2/2008 | Schultz | 379/112.05 |
| 2008/0046477 | A1 * | 2/2008 | Schultz | 707/201 |
| 2008/0065570 | A1 * | 3/2008 | Schultz | 705/412 |

* cited by examiner

*Primary Examiner* — Jonathan Ouellette
(74) *Attorney, Agent, or Firm* — Leydig, Voit & Mayer, Ltd.

(57) ABSTRACT

The described system and apparatus facilitate the identification, on a per rate center (Npa Nxx) basis, of a best carrier rate center for a wireless subscriber, and also allow detection of errors in a provider's local inventory or in performance reference data. In one aspect, carrier performance data is combined with updated available inventory data via a SIT environment to create a correlated array of rate centers relative to service record and orderable carrier rate center inventory. The described system thus provides improved ordering and forecasting compared to existing systems, and can thus also provide enhanced customer satisfaction and a decrease in customer calls for HFC number change.

20 Claims, 5 Drawing Sheets

| $n_1n_2n_3/m_1m_2m_3$ | Carrier ID | Inventory | Performance |
|---|---|---|---|
| 312/678 | Carrier ID1 | Yes | $P_1$ |
| 312/324 | Carrier ID2 | Yes | $P_2$ |
| 301/336 | Carrier ID3 | No | $P_3$ |
| 301/266 | Carrier ID4 | Yes | $P_4$ |
| ⋮ | ⋮ | ⋮ | ⋮ |

RATE CENTER TRANSLATION

BACKGROUND OF THE INVENTION

As cellular and other wireless communication devices have become more universal, the number of companies providing services and/or equipment to facilitate communications among such devices has also increased dramatically. Moreover, the services and rates offered by any one such provider are not always optimum for all users. Thus, it is important for users and hardware providers and activators to appropriately choose and reevaluate different carriers for each customer's situation. However, at present, it is difficult to accurately identify the carrier or rate center that is best suited for a given customer, given the wide variations in customer usage levels, lines and locations.

Existing carrier ordering and activation performance measurement tools typically result in a significant number of mistaken assignments, e.g., economically less than optimal assignments, causing the activating company to experience an excessive number of customer care calls to service subscribers requesting phone number changes. A root cause of this problem is that it is currently quite difficult for a provider to accurately assess local contractual carrier rate centers to be part of the provider's orderable carrier rate center inventory, or to detect a decrease in local performance or to identify a carrier rate center that is not performing correctly.

Although there are existing published ranking schemes such as AMERICAN ROAMER, it remains difficult to independently verify and error check the data presented by such schemes. Moreover, more efficient and accurate performance assessment would also assist in accurately identifying rate centers (Npa Nxx) that do not return local inventory, which identification would be useful in order to allow a provider to approach new carriers to help fill these non-local gaps with new local rate centers. The present inability to appropriately utilize this information leads to subscriber dissatisfaction and unnecessary customer care calls.

BRIEF SUMMARY OF THE INVENTION

The invention provides a system and apparatus for configuring and translating a subscriber's home, cellular, business or dealer's phone numbers, both landline and cellular rate centers into contractual rate centers for monthly forecasting. Regarding nomenclature, it will be appreciated that the North American Numbering Plan (NRNP) dialing system currently in effect in the United States and many other locales both in North America and elsewhere, provides a number format that can be represented as +1-NPA-NXX-xxxx. Within this system, the first three digits are commonly referred to as the area code, while the three digits following the area code are commonly referred to as the telephone exchange or prefix.

The disclosed system and method facilitate the identification, on a per rate center (Npa Nxx) basis, of a best possible carrier rate center, and the detection of possible improvements in locating new carriers with better local inventory. These improvements in ordering and measuring activation performance will help improve subscribers' initial impression of a carrier and will reduce the number of customer care calls servicing subscriber requests for phone number change.

On a predetermined periodic, e.g., monthly, basis, recent carrier performance data, e.g., the latest AMERICAN ROAMER production tables, is combined with an updated carrier alliance list of available inventory for carrier handsfree calling numbers. Both sources of data are entered into a SIT (System Integration Testing) environment to create an array of known industry-recognized rate centers (Npa Nxx's). The rate centers are then translated into best rated or ranked local contractual carrier rate centers to select in production and also to be part of the provider's orderable carrier rate center inventory.

The process then generates a table of unique rate centers (Npa Nxx) with respect to a specific HFC carrier's rate center and the rated or ranked performance that rate center was able to activate. This rated or ranked performance is then used in one implementation to measure performance going forward, e.g., to measure a subsequent decrease in local performance and/or to identify carrier rate centers that are not performing correctly.

This performance information is in turn used to check the input production data for corruption, and/or to determine if the provider's inventory tables are correct, and/or to determine if inventory needs to be reordered and loaded into production for the provider. This performance rating or ranking can also be used to identify rate centers (Npa Nxxs) that do not return local inventory so that this data can be used to identify new carriers to fill non-local gaps with new local rate centers that will help increase subscriber satisfaction and reduce the waste of customer care resources.

The benefits provided by the described system include improved ordering/forecasting compared to other systems such as the BID (Billing system ID) ordering method. The latter provides an overly broad ordering level that often leads to subscriber calls to change HFC numbers for a more local line range within the BID. Instead, the provider can now order/forecast to match subscriber rate centers to provider-contracted carrier rate centers.

As alluded to above, a further benefit of the described system is that it gives the provider the ability to assign a rated or ranked activation performance to each rate center, to measure local activation performance, correct for data corruption, and alleviate inventory shortages. Other objects and advantages of the invention will become apparent upon reading the following detailed description and upon reference to the drawings.

DETAILED DESCRIPTION OF THE INVENTION

Before discussing the details of the invention and the environment wherein the invention may be used, a brief overview is given to guide the reader. In general terms, not intended to limit the claims, the invention includes a system and apparatus for configuring and translating a subscriber's home, cellular, business or dealer's phone numbers, both landline and cellular rate centers, into contractual rate centers for monthly forecasting. As noted above, the disclosed system and method facilitate the measurement on a per rate center (Npa Nxx) basis of a "Best Possible" carrier rate center, and also allows the identification of new carriers with better local inventory. These improvements in ordering and measuring activation performance will help improve a subscriber's initial impression of a carrier and will reduce the number of customer care calls directed to subscriber requests for phone number change.

In one aspect, available production data is combined with provider inventory information for carrier hands-free calling numbers on a predetermined periodic, e.g., monthly, basis, and these data groups are provided as input to a SIT environment to create an array of industry recognized rate centers (Npa Nxx's). The rate centers are then translated into best rated or ranked local contractual carrier rate centers to select in production and/or to be part of the provider's orderable carrier rate center inventory.

The output of the process in one implementation is a table of unique rate centers (Npa Nxx) to a specific HFC carrier's rate center and the rated or ranked performance that rate center was able to activate. This rated or ranked performance can then be use to measure performance going forward, to identify any decrease in local performance in production and to identify which carrier's rate centers are not performing correctly. This performance information can then be use to check the input data for corruption, i.e., to verify the public performance information and to verify or supplement the provider's inventory data. As noted above, this performance rating or ranking may also identify rate centers (Npa, Nxx) that do not return local inventory so that the provider can then identify new carriers to fill non-local gaps with new local rate centers. The system thus provides improved provider ordering/forecasting by correlating subscriber rate centers to contracted carrier rate centers and also assists the provider in ensuring that they have a comprehensive inventory.

Figure 1:
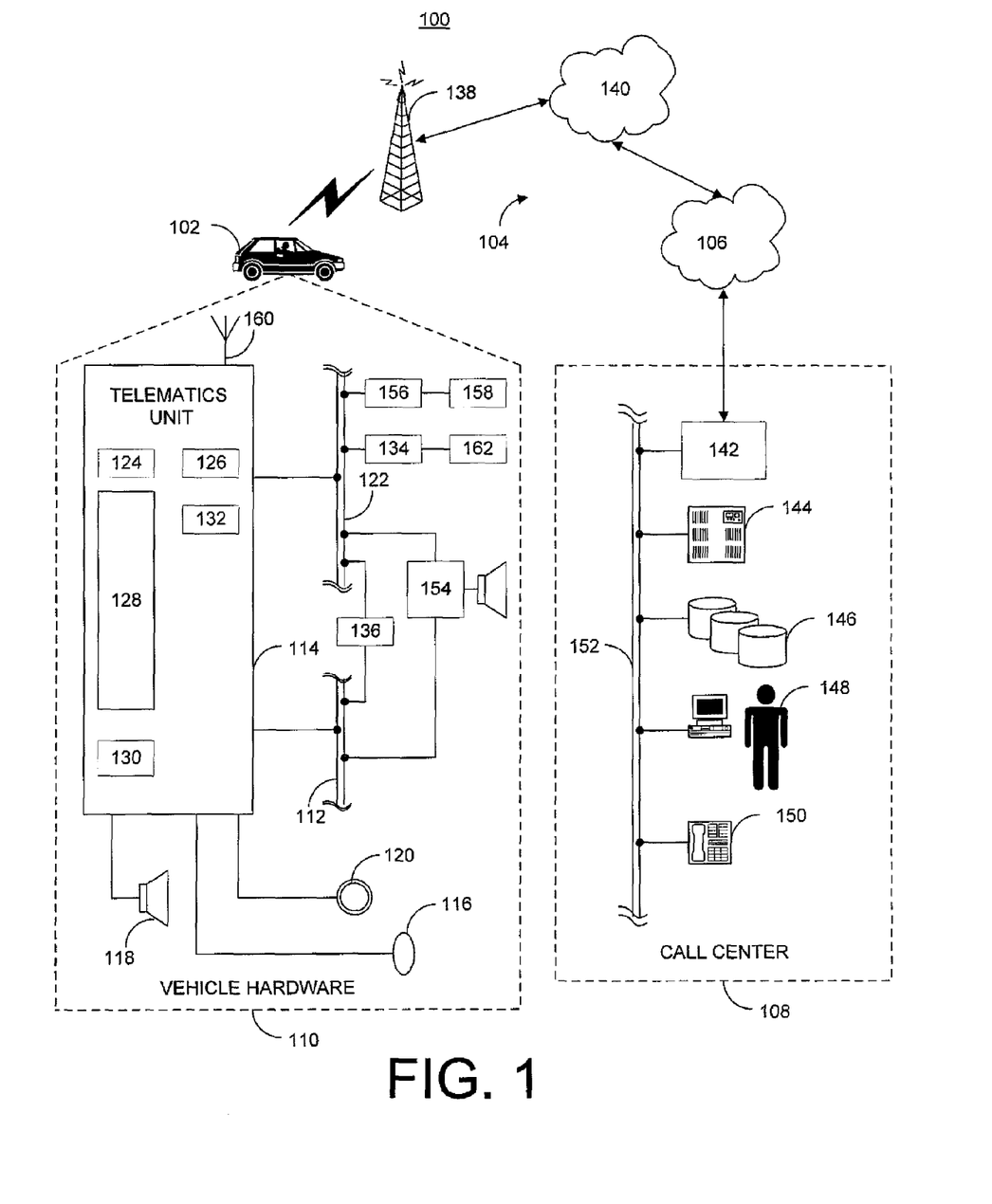
FIG. 1 is a schematic diagram of an operating environment for a mobile vehicle communication system.

Given this overview, an exemplary environment in which the invention may operate is described hereinafter. It will be appreciated that the described environment is an example, and does not imply any limitation regarding the use of other environments to practice the invention. With reference to FIG. 1 there is shown an example of a communication system 100 that may be used with the present method and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100; however, other systems not shown here could employ the present method as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128 one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128. The cellular chipset/component 124 and the wireless modem 126 may be called the network access device (NAD) 180 of the telematics unit 114.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various crash and or collision sensor interface modules 156 and sensors 158 located throughout the vehicle. Infotainment-related services where music, Web pages, movies, television programs, video games and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit 114 is capable of offering. It is anticipated that telematics unit 114 include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission. In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech. The vehicle hardware also includes one or more buttons or controls 120 for enabling a vehicle occupant to activate or engage one or more of the vehicle hardware components 110. For example, one of the buttons 120 can be an electronic push button used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112.

The vehicle crash and/or collision detection sensor interface 156 are operatively connected to the vehicle bus 122. The crash sensors 158 provide information to the telematics unit 114 via the crash and/or collision detection sensor interface 156 regarding the severity of a vehicle collision, such as the angle of impact and the amount of force sustained.

Vehicle sensors 162, connected to various sensor interface modules 134 are operatively connected to the vehicle bus 122. Example vehicle sensors include but are not limited to gyroscopes, accelerometers, magnetometers, emission detection and/or control sensors, and the like. Example sensor interface modules 134 include power train control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. A component in the mobile switching center may include a remote data server 180. As appreciated by those skilled in the art, various cell tower/base station/MSC arrangements are possible and could be used with wireless system 104. For example, a base station and a cell tower could be co-located at the same site or they could be remotely located, and a single base station could be coupled to various cell towers or various base stations could be coupled with a single MSC, to but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

Call Center (OCC) 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing.

The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, maimed or unmanned, mobile or fixed, to or from which it is desirable to exchange voice and data.

Figure 2:
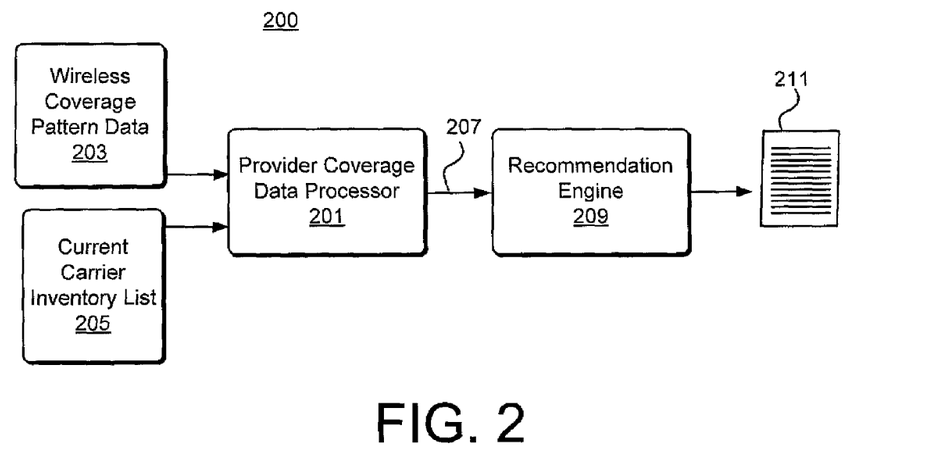
FIG. 2 is a data chart showing inputs, outputs, and processing modules with respect to a data processing system in keeping with the described principles.

Turning to the details of the system operating within, e.g., the described environment, the system described herein configures and translates a subscriber's home, cellular, business or dealer's phone numbers, both landline and cellular rate centers, into contractual rate centers for monthly forecasting. An example of a subscriber cellular device is the network access device 180 of the telematics unit 114 of FIG. 1. The steps of the process are executed in conjunction with a computing device associated with the provider, such as the servers 144 of the call center 108 or otherwise. FIG. 2 is a data chart showing inputs and outputs with respect to a data processing system in keeping with the described principles. The illustrated data chart 200 includes a provider coverage data processor 201 having at least two data inputs and a data output. A first data input consists of wireless coverage pattern data 203, e.g., a U.S. coverage map or data table organized by carrier. An example of such data is the AMERICAN ROAMER coverage data published on a monthly basis.

In parallel with the receipt of the first data input 203 the provider coverage data processor 201 also receives a second data input consisting of a current carrier inventory list 205 that specifies the provider's available inventory for carrier hands-free calling numbers, whether as a result of ownership, alliance, or other contractual arrangement. As a result of the receipt of the wireless coverage pattern data 203 and the current carrier inventory list 205, the provider coverage data processor 201 translates the known rate centers into ranked local contractual carrier rate centers, i.e., to select in production and/or to be part of the provider's orderable carrier rate center inventory.

The provider coverage data processor 201 then generates, based on the ranked local contractual carrier rate center data, an output that consists of a ranked data stream or table correlating unique rate centers (Npa Nxx) to a specific HFC carrier's rate center and the rated or ranked performance that rate center was able to activate previously. The data of the output 207 is then processed further by the recommendation engine 209 to produce a rate center recommendation 211. As noted above, the rate center recommendation 211 may consist of data identifying a rate center to be assigned to a customer of the provider, or may consist of a list of one or more rate centers that are underperforming or that are currently unserved.

It will be appreciated that the architecture of FIG. 2 is preferably computer implemented. In particular, one or more computing devices or computers operate on the basis of computer-executable instructions read from a tangible computer-readable medium such as a disc or drive to instantiate and execute the identified modules in coordination with the noted inputs and outputs. Although any data in the system 200 may be exposed to the user via a screen, print out or other user interface, it is preferable that at least the rate center recommendation 209 be exposed to the user to allow further user action.

Figure 3:
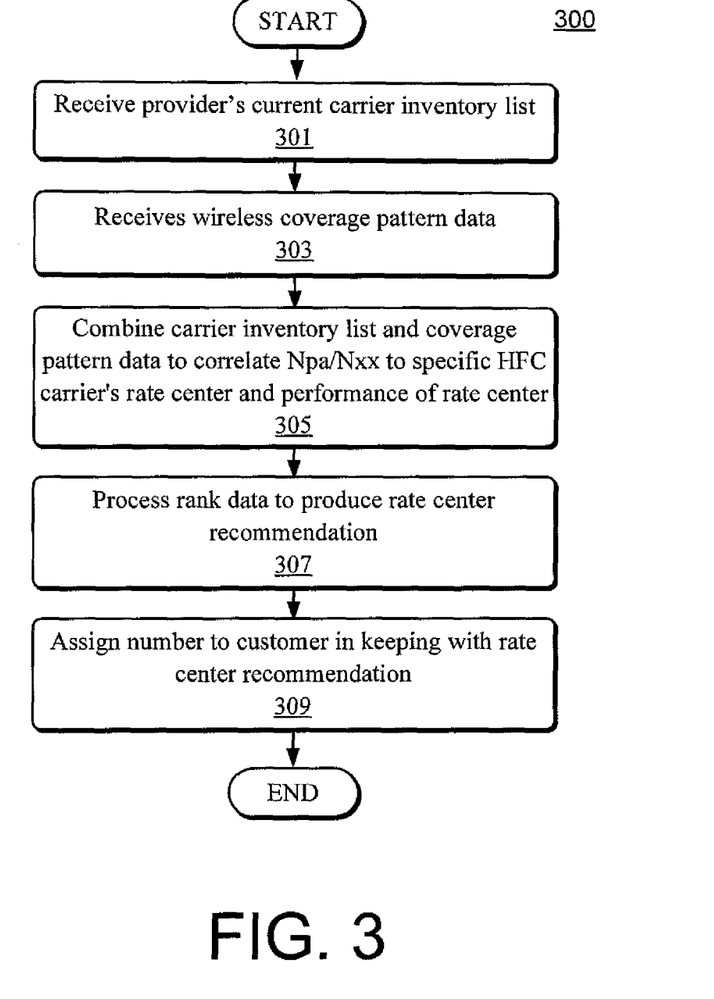
FIG. 3 is a flow chart illustrating a rate center translation process in keeping with the described principles.

It will thus be appreciated that the disclosed system 200 is used according to one or more methods to improve customer service and/or to improve provider responsiveness and efficiency. To this end, FIG. 3 is a flow chart illustrating a rate center translation process 300 in keeping with the described principles. At the outset of the process 300, the service provider supplies, and the system receives, a current carrier inventory list such as list 205 at stage 301. It will be appreciated that in one implementation, the received carrier inventory list may be a proposed carrier inventory list rather than an actual current or past carrier inventory list.

At stage 303, the service provider supplies, and the system receives, a body (listing, table, array, etc.) of wireless coverage pattern data, e.g., the wireless coverage pattern data 203 discussed with respect to FIG. 2 above. Having received both the carrier inventory list and the wireless coverage pattern data, the system then combines the data at stage 305 to produce a ranking, e.g., a ranked data stream or table, correlating unique rate centers (Npa Nxx) to a specific HFC carrier's rate center and the rated or ranked performance that the rate center was able to achieve.

The system further processes the rank data at stage 307 to produce a rate center recommendation, e.g., data identifying a rate center to be assigned to a customer of the provider, or the identities of underperforming or unserved rate centers. Finally, at stage 309, the system assigns a number to a customer in keeping with the rate center recommendation. It will be appreciated that the assignment step may be automatically carried out by the system itself, or may be executed via an automated request to service personnel or otherwise.

Figure 4:
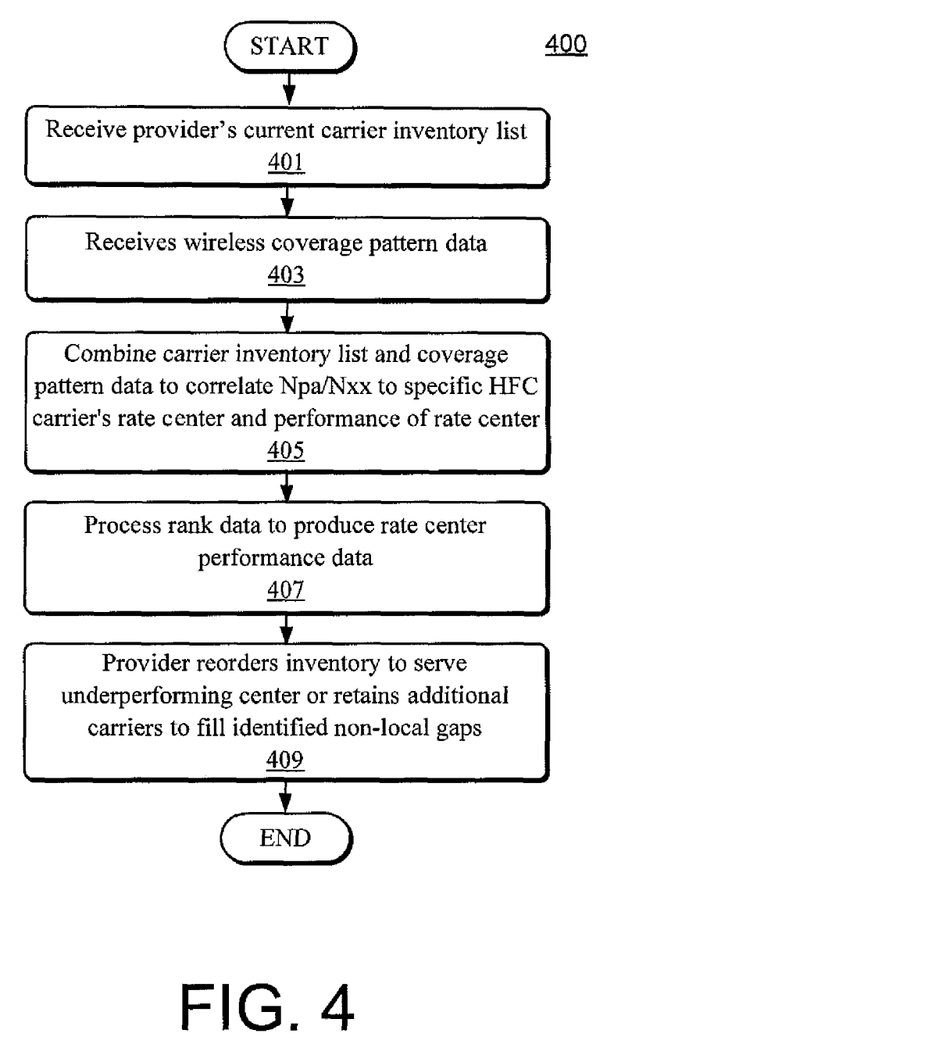
FIG. 4 is a flow chart illustrating an alternative rate center translation process in keeping with another aspect of the described principles.

As noted above, the system can be beneficially used to provide a rate center recommendation in one implementation. However, there are also other valuable uses of the system in keeping with other aspects of the disclosed principles. FIG. 4 is a flow chart illustrating a rate center translation process 400 in keeping with a further aspect of the disclosed principles. In the early stages, the process 400 is similar to the process 300, and these early steps will be only briefly discussed before proceeding further. Thus, at the outset of the process 400, the service provider supplies, and the system receives, a current carrier inventory list at stage 401 and a body of wireless coverage pattern data at stage 403, as in the process 300. Similarly, the system combines the data at stage 405 to produce a ranking, e.g., a ranked data stream or table, correlating unique rate centers (Npa Nxx) to a specific HFC carrier's rate center and the rated or ranked performance that the rate center was able to achieve.

At stage 407, the processes diverge, as the process 400 processes the rank data at stage 407 to produce rate center performance data, e.g., data identifying underperforming and/or unserved rate centers relative to the current carrier inventory list. For example, the rate center performance data may indicate that a first rate center $n_1n_2n_3/m_1m_2m_3$ listed in the current inventory list is underperforming relative to other carriers' performance in the same rate center, and may identify rate center $n_4n_5n_6/m_4m_5m_6$ as being present in the rank data and not in the current inventory list, i.e., as being an unserved rate center. In the former case, the provider may wish to reorder inventory to serve the underperforming center, whereas in the latter case, the provider may wish to retain additional carriers to fill the identified non-local gaps. These alternative actions are shown by way of example at stage 409.

Figure 5:
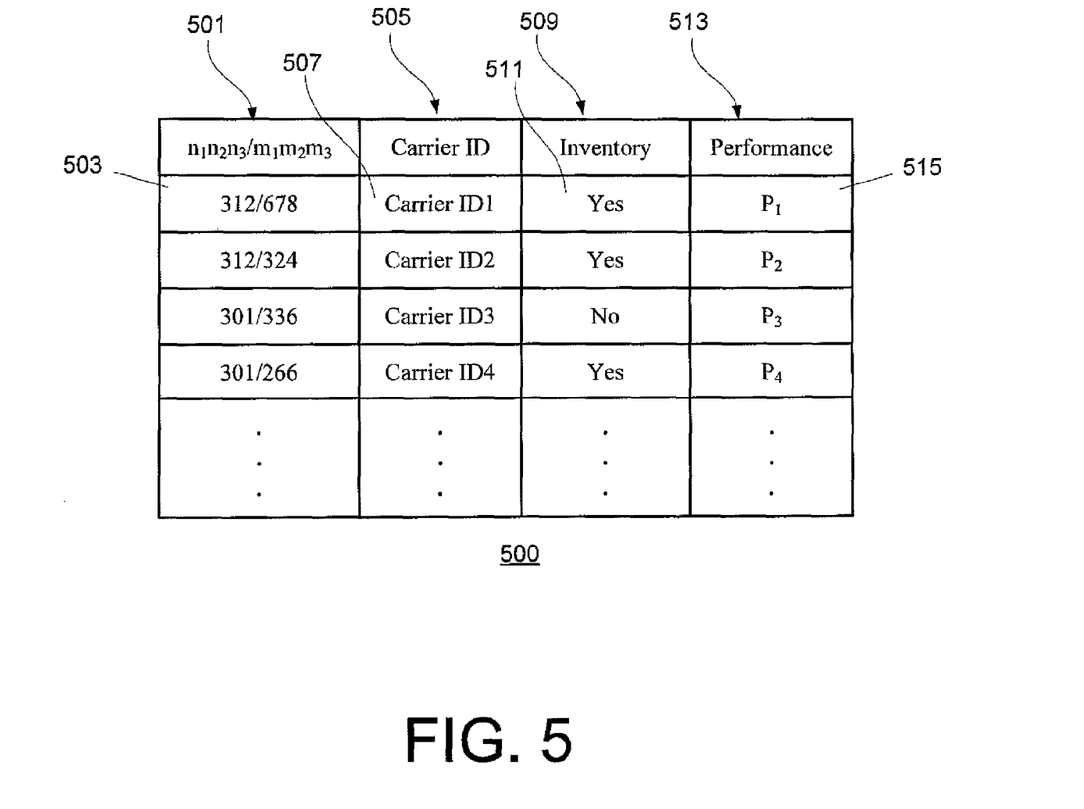
FIG. 5 is a data table illustrating an exemplary format for rate center, carrier, inventory, and performance data correlation in keeping with an aspect of the described principles.

Although the structure of the rank data at stages 307 and 407 is susceptible to various formats and presentations, an exemplary format 500 is illustrated in data table format in FIG. 5. In the illustrated format, the data table 500 includes a number of correlated fields and associated entries. In particular, in the illustrated example, the data table 500 includes a rate center column 501 including individual rate center identifications 503 ($n_1n_2n_3/m_1m_2m_3$), as well as a carrier column 505 including carrier fields 507 indicating carriers serving respective rate centers. The illustrated data table 500 also includes an inventory column 509 including individual inventory fields 511 indicating whether a particular rate center is included in the provider's current inventory, in registration with a performance column 513 containing fields 515 indicating a performance value $P_x$ for each respective rate center.

It will be appreciated that the disclosed method of rate center translation provides an improvement in current ordering/forecasting methodology and will lead to improved provider efficiency and customer satisfaction. It will also be appreciated, however, that the foregoing methods and implementations for improving rate center tracking and assignment are merely examples of the inventive principles, and that these illustrate only preferred techniques. It is contemplated that other implementations of the invention may differ in detail from foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A computer-implemented method of translating provider inventory data to provide rate center data for number assignment, the method comprising:
   providing rate center performance data indicating performance of one or more rate centers associated with one or more wireless carrier entities;

providing provider inventory data indicative of an inventory of wireless carrier rate centers to which the provider is able to assign customers;

generating rank data, by a computer, which correlates a plurality of rate center identifiers with respective carriers, by transforming the rate center performance data and the provider inventory data;

storing the rank data on at least one computer readable medium; and assigning to a customer a mobile number including a rate center identifier selected from the rank data.

2. The method of translating provider inventory data according to claim 1, further comprising generating a rate center recommendation for the provider based on the rank data.

3. The method of translating provider inventory data according to claim 2, wherein generating a rate center recommendation for the provider based on the rank data further comprises:

receiving customer usage information; and selecting a rate center based further on the customer usage information in order to minimize a customer cost.

4. The method of translating provider inventory data according to claim 3, wherein the customer is an existing customer of the provider, and the step of assigning to the customer a mobile number further comprises unassigning a prior customer mobile number.

5. The method of translating provider inventory data according to claim 1, wherein each rate center includes both an area code and a telephone exchange.

6. The method of translating provider inventory data according to claim 5, wherein assigning to a customer a mobile number comprising a rate center indicator selected from the rank data further comprises assigning a rate center that is not included in the provider inventory data.

7. The method of translating provider inventory data according to claim 6, further comprising adding the rate center that is not included in the provider inventory data to the provider inventory.

8. A computer implemented method of translating provider inventory data to provide rate center data for provider inventory correction, the method comprising:

providing rate center performance data indicating performance of one or more rate centers associated with one or more wireless carrier entities;

providing provider inventory data indicative of an inventory of wireless carrier rate centers to which the provider is able to assign customers;

generating rank data, by a computer which correlates a plurality of rate center identifiers with respective carriers, by transforming the rate center performance data and the provider inventory data storing the rank data on at least one computer readable medium;

identifying one or more rate centers in the rank data that are not represented in the provider inventory data and modifying the provider inventory data to include at least one rate center so identified; and storing the modified provider inventory data on at least one computer readable medium.

9. The method of translating provider inventory data according to claim 8, wherein modifying the provider inventory to include at least one rate center so identified comprises ordering inventory from a carrier represented in the inventory data.

10. The method of translating provider inventory data according to claim 8, wherein modifying the provider inventory to include at least one rate center so identified comprises ordering inventory from a carrier not represented in the inventory data.

11. The method of translating provider inventory data according to claim 10, further comprising the step of identifying one or more rate centers in the rank data that are represented in the provider inventory data as being associated with a first carrier but as being underserved.

12. The method of translating provider inventory data according to claim 11, further comprising modifying the provider inventory to include inventory supplied by a second carrier serving the one or more underserved rate centers.

13. The method of translating provider inventory data according to claim 9, wherein each rate center includes both an area code and a telephone exchange.

14. A rate center translation tool comprising:

a provider coverage data processor having first and second data inputs and a data output;

a wireless coverage pattern data source communicably linked to the first data input, configured wherein the wireless coverage pattern data source provides information regarding rate center performance by carrier; and a current provider inventory list data source communicably linked to the second data input, configured wherein the current carrier inventory list data source provides information regarding a provider's available inventory for assigning carrier hands-free calling numbers;

configured wherein the provider coverage data processor transforms the rate center performance by carrier data and the current provider inventory list data into ranked rate center data.

15. The rate center translation tool according to claim 14, further comprising a recommendation engine communicably linked to the data output to receive the ranked rate center data and to provide a coverage recommendation based on the ranked rate center data.

16. The rate center translation tool according to claim 15, further comprising displaying the coverage recommendation based on the ranked rate center data to a human user.

17. The rate center translation tool according to claim 15, wherein each of the provider coverage data processor and the recommendation engine are computer-instantiated from computer-executable instructions stored on one or more non-transitory computer-readable media.

18. The rate center translation tool according to claim 15, wherein the ranked rate center data correlates one or more rate centers to respective rate center performance indicators and to one or more respective inventory values.

19. The rate center translation tool according to claim 15, wherein the information regarding rate center performance by carrier is a commercially available product.

20. The rate center translation tool according to claim 15, wherein the information regarding rate center performance by carrier is derived by the provider.

* * * * *